March 24, 1953     A. JAMACK     2,632,483
POWER SAW GUIDE GAUGE
Filed June 22, 1950
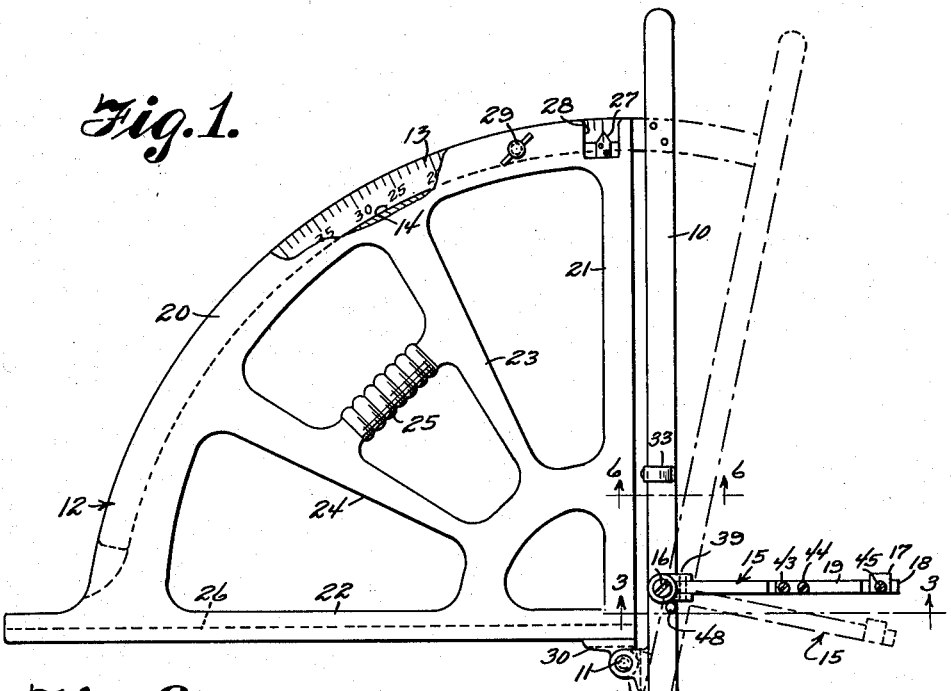
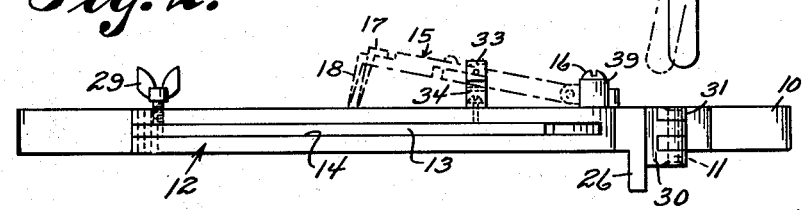
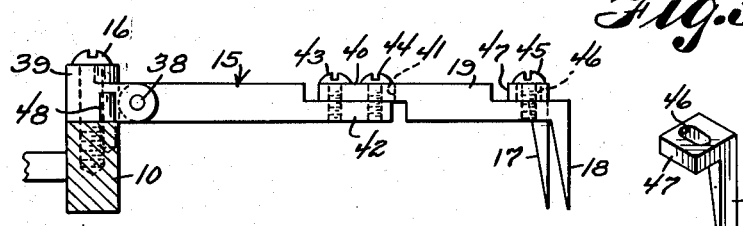
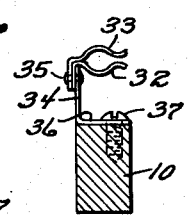
INVENTOR.
Albert Jamack
BY Victor J. Evans & Co.
ATTORNEYS

UNITED STATES PATENT OFFICE 2,632,483

POWER SAW GUIDE GAUGE

Albert Jamack, Spencer, Mass.

Application June 22, 1950, Serial No. 169,575

2 Claims. (Cl. 143—6)

This invention relates to tools for carpenters and the like, and in particular a device for guiding a power saw particularly for cutting a piece of lumber at an angle and in which gage means is provided for setting the guide at the exact distance from the line of the cut.

The purpose of this invention is to provide means for holding a power saw of the hand actuated type whereby the saw is prevented from walking to the right or left and whereby the distance of the guide from the cut is accurately determined.

In cutting lumber for framing in building construction it is necessary to cut ends of boards at different angles and after the angle has been determined it is often necessary to cut a plurality of boards at the same angle. Various devices have been provided for setting a saw guide at different angles in relation to the work but as power saws are not standardized it is difficult to set the guide at the correct distance from the line of cut. With this thought in mind this invention contemplates a gage having a guide bar adjustably mounted thereon and a gage arm adjustably mounted on the guide bar to facilitate setting the guide bar to compensate for saws of different thicknesses and also for saw housings of different designs.

The object of this invention is, therefore, to provide means for constructing a guide for power driven hand saws whereby a guide bar is accurately spaced from the line of a cut and whereby a gage arm by which the guide bar is set is moved to an out of the way position after the guide bar is set.

Another object of the invention is to provide gage means on a power hand saw guide which means is provided to compensate for saws of different thicknesses.

A further object of the invention is to provide a power hand saw guide having a gage for setting the guide in relation to the type of saw used, which is of a simple and economical construction.

With these and other objects and advantages in view the invention embodies a right angle segment having an arcuate outer edge with a guide bar pivotally mounted on the segment and having a graduated arcuate tongue extended through a groove in the arcuate outer edge of the segment, and a gage arm pivotally mounted on the guide bar and having fingers extended therefrom that are set to correspond with the thickness of a saw used with the guide.

Other features and advantages of the invention will appear from the following description taken in connection with the drawing wherein:

Figure 1 is a plan view of the improved saw guide showing the guide bar and gage arm in adjusted positions in dotted lines and in which part is broken away showing the graduations on the arcuate tongue of the guide bar.

Figure 2 is a side elevational view of the guide.

Figure 3 is a side elevational view of the gage arm taken on line 3—3 of Figure 1 and showing the guide bar on which the arm is pivotally mounted in section.

Figure 4 is an end elevational view looking toward the outer end of the gage arm.

Figure 5 is a detail illustrating one of the adjustably mounted gage fingers.

Figure 6 is a cross section through the guide bar taken on line 6—6 of Figure 1 illustrating the spring clip for holding the gage arm.

Referring now to the drawing wherein like reference characters denote corresponding parts the improved guide for power hand saws of this invention includes a guide bar 10 pivotally mounted by a pin 11 on a segment 12 with a graduated arcuate tongue 13 extended from the guide bar into a groove 14 in the peripheral edge of a segment and a gage arm 15 pivotally mounted on the bar 10 by a screw 16 and having gage fingers 17 and 18 on the end of an outer section 19, thereof.

The segment 12 is formed with an arcuate outer end 20 with end sections 21 and 22 and with radially disposed ribs 23 and 24. The segment is provided with a handle 25 that is positioned on the ribs 23 and 24. The end 22 is provided with a depending flange 26 that is positioned against the edge of a board or other piece of lumber and with the flange positioned against the edge of the lumber the guide bar 10 is set to the desired angle by positioning the graduations corresponding with the angle on the pointer 27 in the gap 28 of the rim 20 of the segment and with the guide bar 10 in the proper position the thumb screw 29 is tightened thereby clamping the parts in the adjusted position.

The segment 12 is provided with a bearing 30 and the guide bar 10 is provided with a similar bearing or hinge element as indicated by the numeral 31 and the pin 11 extends through tongues of these elements, as shown in Figure 2.

The guide bar 10 is provided with a spring clip having a lower section 32, an upper section 33 and a support 34 with the sections 32 and 33 mounted on the support by a rivet 35 and with a base 36 as a support secured to the guide bar 10 by a screw 37.

The spring clip is positioned to receive the outer end of the gage arm 15 which is pivotally mounted by a pin 38 in a hub 39 on the screw 16 and the outer section 19 of the arm is provided with a flange 40 having a slot 41 therein through which it is adjustably mounted on a similar flange 42 on the outer end of the arm 15 by screws 43 and 44.

The finger 18 is integral with the outer end of the section 19 of the gage arm and the finger 17 is adjustably mounted on the section 19 by a screw 45 that extends through a slot 46 in a flange 47 which forms a base of the finger 17.

With the parts arranged in this manner the improved power hand saw guide is positioned on a board or other piece of lumber with the flange 26 positioned against the edge of the lumber and the guide bar 10 is set by the gage arm 15 to the desired angle and with the gage bar secured in position by the thumb screw 29 and gage arm 15, which in the extended position is held by a thumb pin 48 is turned to a position upon the bar 10 where it is held by the spring clip formed with the fingers 32 and 33, as shown in dotted lines in Figure 2.

The position of the guide is determined by the gage arm, the fingers 17 and 18 of which are set to correspond with the thickness of the saw and the distance of the saw from the base of the housing thereof.

With the base of the saw housing positioned against the guide bar 10 the saw is positively actuated whereby a straight line is cut across the board or other piece of lumber.

In operation, the power saw guide or square is used particularly for power hand saws and the segment 12 is placed on the work, such as a piece of lumber. The thumb screw 29 is loosened and the guide 10 set to the desired degree, as indicated by the dot and dash lines and with this guide, the straight edge or bar set in this position, which represents the angle of the cut the thumb screw 29 is tightened. The position of the segment on the lumber or work is set by the gage 15 which determines the proper distance of the guide or square from the mark or line on the work. When it is desired to make the cut on the right hand side of the line the point 17 is positioned on the mark and when it is desired to make the cut on the left hand side the pointer 18 is set on the mark or line. The point 17 is adjustable to the thickness of the saw blade and the arm 19 is adjustable to different distances to correspond with the different widths from guides to saw blades of saws of different types.

With this distance determined the gage 15 is snapped between the spring fingers 32 and 33 and the guide or square is in proper position for marking the cut.

It will be understood that other modifications may be made in the design and arrangement of the parts without departing from the spirit of the invention.

What is claimed is:

1. In a saw guide, the combination which comprises a segment having edges positioned at a right angle in relation to each other the outer ends of the edges being connected by an arcuate member having a groove therein, a guide bar pivotally mounted on the segment and having a graduated tongue extended into the groove of the arcuate member of the segment, a gage arm pivotally mounted on the guide bar, means adjusting the length of the gage arm, and a plurality of fingers carried by the outer end of the gage arm, one of said fingers being adjustable in relation to the other to compensate for the thickness of a saw.

2. In a saw guide, the combination which comprises a segment having edges positioned at a right angle in relation to each other the outer ends of the edges being connected by an arcuate member having a groove therein, a guide bar pivotally mounted on the segment and having a graduated tongue extended into the groove of the arcuate member of the segment, a gage arm pivotally mounted on the guide bar, means adjusting the length of the gage arm, a plurality of fingers carried by the outer end of the gage arm, one of said fingers being adjustable in relation to the other to compensate for the thickness of a saw, and a spring clip positioned on the guide bar for retaining the gage arm in an inoperative position.

ALBERT JAMACK.

REFERENCES CITED

The following references are of record in the file of this patent:

UNITED STATES PATENTS

| Number | Name | Date |
|---|---|---|
| 219,942 | Heiran | Sept. 23, 1879 |
| 622,190 | Seavey | Mar. 28, 1899 |
| 1,911,045 | Tinnen | May 23, 1933 |
| 2,205,095 | Jacobsen | June 18, 1940 |
| 2,527,754 | McDernett | Oct. 31, 1950 |